United States Patent [19]

Zhao

[11] Patent Number: 6,002,406
[45] Date of Patent: Dec. 14, 1999

[54] SYSTEM AND METHOD FOR STORING AND ACCESSING DATA REPRESENTATIVE OF AN OBJECT IN VARIOUS LEVEL-OF-DETAIL

[75] Inventor: Ze Hong Zhao, Mountain View, Calif.

[73] Assignee: Silicon Graphics, Inc., Mountain View, Calif.

[21] Appl. No.: 08/749,287

[22] Filed: Nov. 13, 1996

[51] Int. Cl.$^6$ .................................................. G06T 1/60
[52] U.S. Cl. .......................... 345/429; 345/428; 345/430; 345/139
[58] Field of Search .................... 345/423, 507, 345/419, 139, 428, 429, 430

[56] References Cited

U.S. PATENT DOCUMENTS

| | | | |
|---|---|---|---|
| 4,291,380 | 9/1981 | Rohner | 364/522 |
| 4,646,251 | 2/1987 | Hayes et al. | 364/518 |
| 4,692,880 | 9/1987 | Merz et al. | 345/428 |
| 4,715,005 | 12/1987 | Heartz | 364/521 |
| 4,727,365 | 2/1988 | Bunker et al. | 345/429 |
| 4,821,212 | 4/1989 | Heartz | 364/521 |
| 4,888,713 | 12/1989 | Falk | 364/522 |
| 4,912,659 | 3/1990 | Liang | 364/521 |
| 4,912,664 | 3/1990 | Weiss et al. | 364/577 |
| 4,933,889 | 6/1990 | Meshkat et al. | 364/578 |
| 5,367,615 | 11/1994 | Economy et al. | 345/429 |
| 5,438,654 | 8/1995 | Debrin et al. | 345/428 |
| 5,471,572 | 11/1995 | Buchner et al. | 345/428 |

OTHER PUBLICATIONS

Ferguson, R.L., et al., "Continuous Terrain Level of Detail for Visual Simulation", Presented at the Image V Conference, Phoenix, Arizona, Jun. 19–22, 1990.

Fournier, A., et al., "Computer Rendering of Stochastic Models", *Communications of the ACM*, vol. 25, No. 6, pp. 371–384, Jun. 1982.

Beier, T., et al., "Feature–Based Image Metamorphosis", *Computer Graphics*, vol. 26, No. 2, pp. 35–42, Jul. 1992.

Fournier, A., et al., "Comment on Computer Rendering of Fractal Stochastic Models", *Communications of the ACM*, vol. 25, No. 8, pp. 581–584, Aug., 1982.

Willis, L.R., et al., "A Method for Continous Adaptive Terrain", Presented at the 1996 Image Conference, Scottsdale, AZ, Jun. 23–28, 1996.

Jones, M., "Designing Real–Time 3–D Graphics for Entertainment", *Siggraph '95 Course #6 Manual*, pp. 2–1—2–33, May, 1995.

*Primary Examiner*—Mark R. Powell
*Assistant Examiner*—Kimbinh T. Nguyen
*Attorney, Agent, or Firm*—Sterne, Kessler, Goldstein & Fox P.L.L.C.

[57] ABSTRACT

A system and method for storing a data representative of an object in various LODs. Each LOD representation is divided into a plurality of LOD cells and stored in a secondary memory. A designer designates a set of LOD cells with each of the plurality of LOD cells. When the projection of an eye point falls within a subject LOD cell, the set of LOD cells designated with the subject LOD cell are retrieved into a system memory. Thus, by properly designating the set of LOD cells, the designer may ensure that the desired LOD cells are in the system memory when required for processing. As a result, the data in the LOD cells may be accessed at a relatively high rate from the system memory when processing the LOD data. As only the required cells are retrieved into the system memory, the amount of memory required for storing the LOD data is also minimized.

29 Claims, 5 Drawing Sheets

SYSTEM AND METHOD FOR STORING AND ACCESSING DATA REPRESENTATIVE OF AN OBJECT IN VARIOUS LEVEL-OF-DETAIL

CROSS-REFERENCE TO OTHER APPLICATIONS

The following applications contain some common disclosure, and are believed to have effective filing dates identical with that of the present application:

U.S. patent application entitled "A System and Method for Displaying Different Portions of an Object in Different LOD Levels", Attorney Docket No. 15-4-474.00; and U.S. patent application entitled "Providing a Framework for Level-of Detail Transformations", Attorney Docket No. 15-4-374.00.

BACKGROUND OF THE INVENTION

1. Field of the Invention

The present invention relates generally to the field of computer graphics systems, and more particularly to a system and method for storing and accessing data representative of an object in various levels of detail (LODs).

2. Related Art

Graphics systems are often used to display images of objects. A graphics system may store data representative of an object and display an image of the object using the stored data. Such a system may store several representations of an object, with each representation having a different level of detail (LOD). Data representations which have more detail are generally termed as finer level LODs and data representations which have a lesser amount of detail are termed as coarser level LODs.

The amount of detail stored in different LOD representations may be appreciated by drawing an analogy to the detail perceived by an observer while observing an object. For example, very little detail may be perceived by an observer while watching an automobile from a distance. On the other hand, several details such as doors, windows, mirrors will be perceived if the observer is sufficiently close to the automobile. A finer level LOD may include such additional details also.

Graphics systems often store the data corresponding to several LOD representations of an object in a secondary memory (e.g., a hard-drive used in workstations). The LOD data is then retrieved from the secondary memory into a main memory (e.g., random access memory) and processed to generate display signals corresponding to the object. The data is stored in a secondary memory generally due to the large amount of data in each LOD representation, and is retrieved into a main memory due to the faster access usually provided by the main memory. Thus, a graphics system may store a large amount of data corresponding to LOD representations, and at the same time have speedy access to the data by retrieving them into main memory.

Speedy access of the LOD data is often critical for acceptable performance of graphics systems. For example, an interactive application may need access to data corresponding to different portions of an object at different LODs within a short span of time. To generate display signals at an acceptable rate, a graphics system may need fast access to the required data.

However, the graphics system may not have such speedy access to the data, for example, as the data may not be present in the main memory. In such a situation, the required data may first need to be retrieved from the secondary memory into a memory, and then accessed by the graphics system. Due to the relatively slower accessing speed of the secondary memory and due to the multiple retrievals involved, the data may not be provided at a desired rate to the graphics systems. Accordingly, the graphics system may not be able to generate display signals at an acceptable rate. As a result, the display quality may be unacceptable in certain situations.

SUMMARY OF THE INVENTION

The present invention is directed to a system and method for storing and accessing data corresponding to LOD representations of an object. Each LOD is divided into a plurality of LOD cells and the corresponding data is stored in a secondary memory. Only the LOD cells that are presently required or that are determined to be required in the near future are retrieved from the secondary memory and stored into a system memory. As only such required LOD cells are stored in the system memory, the storage space in the system memory is optimally utilized.

In addition, the present invention allows a designer to designate a set of LOD cells with each subject LOD cell. If the projection of an eye-point (viewpoint, camera) falls within a subject cell, the set of cells designated with the subject cell arc also retrieved into the system memory. Thus, the designer is provided the ability to indicate the potential LOD cells that may be required in the near future for processing. Assuming an optimal designation of the set of cells with each LOD cell, the probability that a cell required for processing is present in the system memory may be enhanced. As a result, the LOD data may be accessed from the high-speed system memory without significant latencies.

One advantage of the present invention is that it enables the storage space in system memory to be utilized efficiently. This is accomplished by retrieving and storing only the required and potentially required LOD cells.

Another advantage of the present invention is that it allows a designer to specify which of the LOD cells need to be pre-fetched into the system. This is accomplished by enabling a designer to designate a set of LOD cells with each cell, and retrieving the set of LOD cells if the projection of the eye-point falls within the cell.

BRIEF DESCRIPTION OF THE FIGURES

The present invention is pointed out with particularity in the appended claims. The above and further features and advantages of the present invention may be better understood by referring to the following description taken in conjunction with the accompanying drawings, in which:

DETAILED DESCRIPTION OF THE PREFERRED EMBODIMENTS

Figure 1:
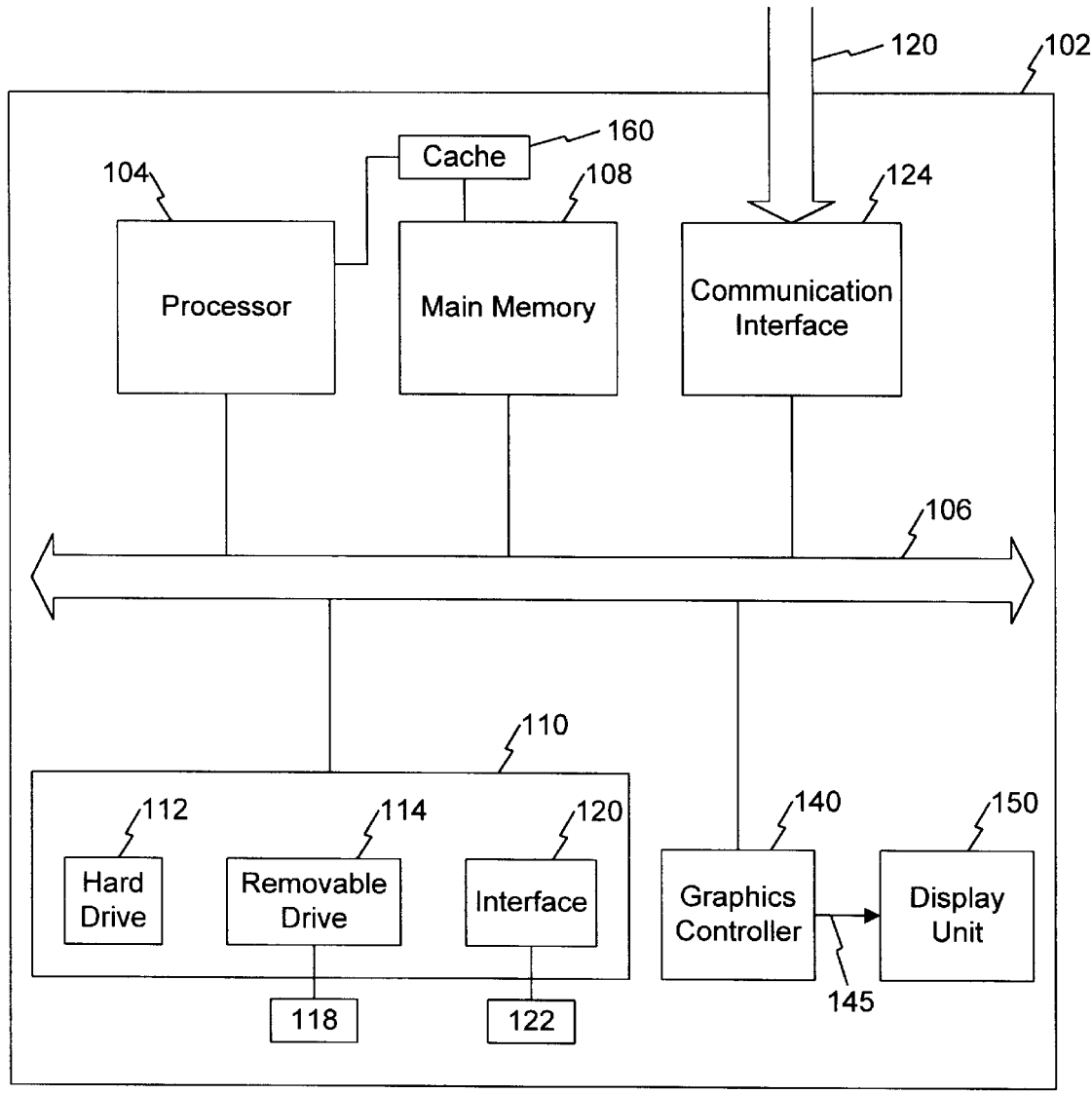
FIG. 1 is a block diagram of an example computer system implementing the present invention.

1. Overview and Discussion of the Invention

The present invention is directed to a method and system for storing various LOD representations of an object in a secondary memory and retrieving pre-designated portions of the LOD data into a system memory for further processing. The portions are pre-designated and stored in system memory to increase the probability that a desired data portion is available in the system memory when required for processing.

An object, as used in the present application, may be any entity which is the subject of a representation in an image. Thus, an object may include, without limitation, terrains, places, things, people, or images generated by a machine or a person etc.

In accordance with the present invention, each LOD representation of an object is logically divided into a plurality of LOD cells (preferably a square) and a designer is provided the ability to designate a set of LOD cells associated with each LOD cell. If the projection of an eyepoint (determined for example by the direction of view of a person) falls within a subject LOD cell, the set of LOD cells designated with the subject LOD cell are also retrieved into a system memory. Such a subject LOD cell is determined for each LOD representation, and the corresponding designated LOD cells for all such subject LOD cells are retrieved.

As only the LOD cells that are designated by a designer arc retrieved, a system memory of limited size can store the data from these several LODs. As the required LOD data may be available in the system memory when required for processing, the display of an object to be easily transitioned across different LODs without requiring further retrievals from a secondary memory. As the accesses to the secondary memory are minimized, a system of the present invention may have accesses to LOD data at a desired speed/rate.

In addition, as a designer may be able to anticipate well which other LOD cells may be required for future display given that the projection of an eyepoint is presently on a subject LOD cell, the designer may designate such other LOD cells with that subject LOD cell. Such anticipation may be based, for example, on an understanding of the human psychology or any other factor. If the projection of an eyepoint moves to one of the designated LOD cells, the data for that designated LOD cell may be retrieved directly from the system memory without requiring additional accesses to the secondary memory as the data for such additional LOD cells is also pre-retrieved into the system memory. This may further enable a system of the present invention to access LOD data at a desired speed/rate.

2. Example Environment

Before describing the invention in great detail, it is useful to describe an example environment in which the invention can be implemented. In a broad sense, the invention can be implemented in any graphical system or method, especially ones which store several LOD representations of an object. Such systems include, without limitation, personal computer systems (PCS), work-stations, special purpose computer systems, general purpose computer systems, and many others. The invention may be implemented in hardware, software, firmware, or combination of the like.

3. Method of the Present Invention

Figure 2:
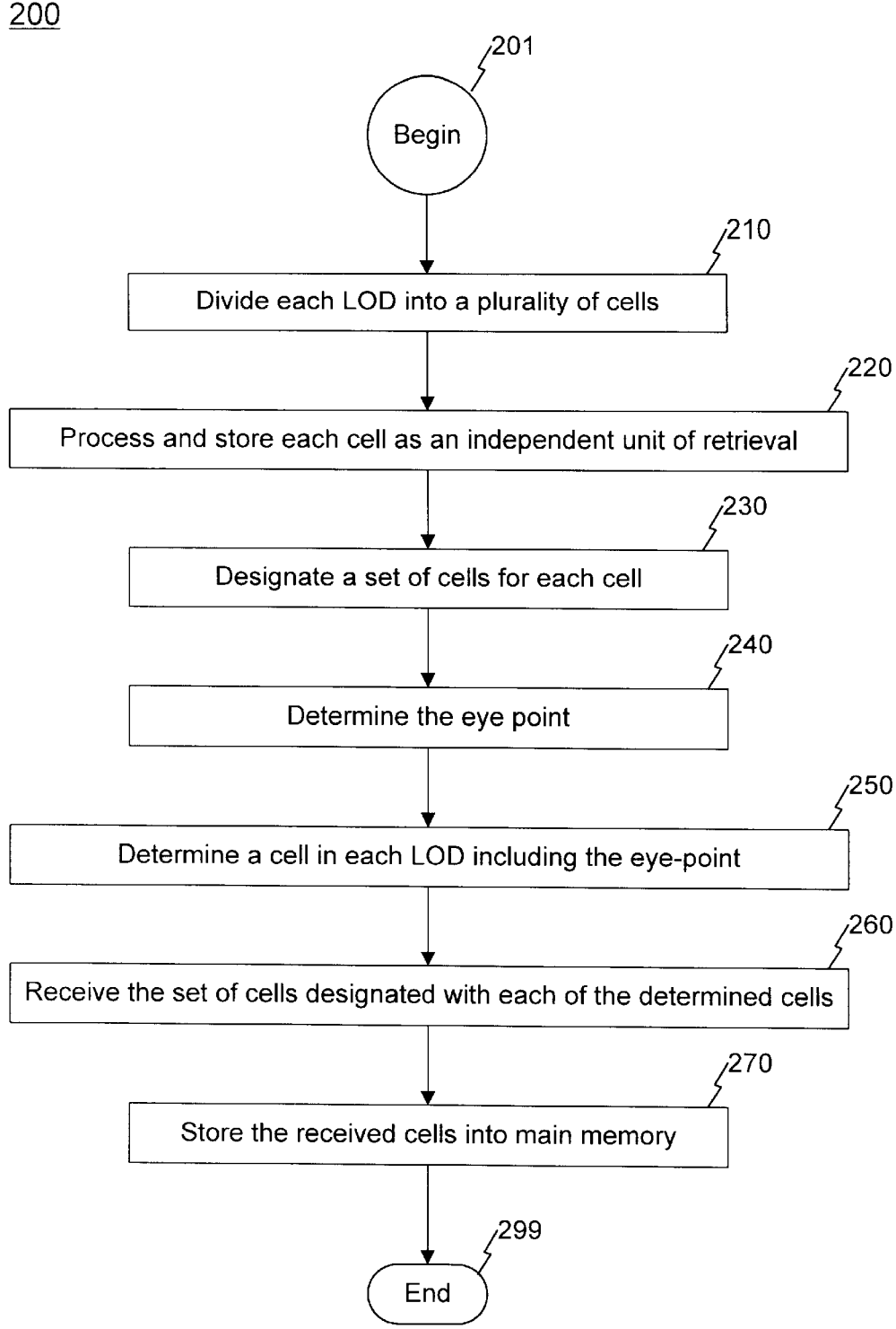
FIG. 2 is a flowchart illustrating a method for storing and accessing LOD data such that the desired LOD data is available in the system memory when required for processing according to one embodiment of the present invention.

The present invention is now explained with reference to flowchart 200 depicted in FIG. 2. In step 210, the present invention allows a designer to divide each LOD representation into a plurality of LOD cells as described below with reference to FIGS. 4 and 5. LOD representations are well-known in the art. However, an example LOD representation is described in the co-pending patent application entitled, "Framework for LOD transformations" referred to in the section above entitled "Related Applications," which is incorporated by reference herein in its entirety.

Each LOD cell represents a portion of the object, and is preferably a square. However, it is contemplated that the present invention can be used with LOD cells having other shapes such as, without limitation, polygons. According to one convention, each defined LOD cell is identified using (X, Y) coordinates, wherein X corresponds to a row number of the LOD cell and Y corresponds to a column number of the LOD cell.

In step 220, each LOD cell is stored in a data source as a unit which can be retrieved independently of other units or LOD cells. That is, other LOD cells need not be retrieved if a desired LOD cell needs to be retrieved. The data source may be within a system implementing the present invention (e.g., secondary memories), or may be outside of the system (e.g., retrieved from a tape, disk, or other storage device over a network or other communication link). If the data source is a computer based secondary storage (e.g., hard-drive), each LOD cell can be stored as a 'file.' After reading the description herein, it will become apparent to one skilled in the relevant art to store LOD cells in other data sources and the units provided with the data sources. Thus, the present invention can retrieve only those LOD cells determined to be necessary, and store the retrieved LOD cells in a system memory. As only the necessary LOD cells are stored in the system memory, the storage space in the system memory is optimally utilized.

In step 230, a designer designates a set (i.e., one or more) of LOD cells with each LOD cell defined in step 210. An LOD cell is typically included in the set if there is a reasonable probability that the LOD cell will be used during subsequent displays. However, other criteria also be used in designating the set. In an example implementation, the set is defined by an offset list, with each element in the list being identified as (A, B). To clarify this implementation, if an LOD cell is identified as (X, Y) and an element of the offset list is identified as (A, B), an LOD cell corresponding to (A+X, B+Y) is assumed to be in the list designated with the LOD cell (X, Y).

Each list has several such elements. The lists corresponding to LOD cells in finer LOD levels are generally longer than that for the LOD cells in coarser LODs. However, the lists corresponding to LOD cells in finer LOD levels can be shorter depending on the requirements of the specific situation. In addition, the designated LOD cells in a list need not be adjacent to each other or to the corresponding LOD cell to which the list relates to. For example, if the view of a terrain having hills is being modeled, the designated LOD cells typically do not include the space corresponding to the invisible terrain behind the hills. That is, assuming the projection of an eye-point falls on a subject LOD cell located on side of the hill, the designated LOD cells for the LOD cells may not include the LOD cells corresponding to the other side. Further, a single list may be shared by several or all LOD cells in an LOD.

Even though the present invention is described with reference to lists which are provided by a designer, the embodiment of present invention computes the designated cell list dynamically (i.e., while a system is in operation) also. For example, a system may examine the direction of approach and the 'nature of the viewpoint,' and dynamically compute the designated LOD cells. As an illustration, assume that the viewpoint of a person in a flight is being modeled. The designated cells for a subject cell can include only the cells in front of the person. In addition, the number of designated cells can be more in the direction of movement of the flight can be more than in other directions.

In an alternative embodiment, the designated cells for a subject cell can include all adjacent cells within a pre-specified distance from the subject cell. For example, all cells which are less than two cells away may be included in a designated cell list.

In step 240, the projection of the eye point is determined as is well known in the art. The projection of eye point usually corresponds to the point of intersection of the line of sight of a person with the object. However, the term eye point as used herein includes a line of direction of a view of a camera. The projection of an eye point is generally a point on the object space. Even though the present invention is described with reference to the projection of an eye point of the object, it will be apparent to one skilled in the relevant art how to implement the present invention with other points of interest after reading the description provided herein.

In step 250, an LOD cell in each LOD including the projection of an eye point is determined. The determination may be based on an examination of the coordinates of the projection of an eye point. In step 260, the set of LOD cells designated with each of the LOD cells determined in step 250 are retrieved from a secondary memory. That is, for each LOD cell (in an LOD) that includes the projection of an eye point, the set of LOD cells designated in step 230 are received. As already noted, the LOD cells may be received from within a system implementing the present invention or from an outside source (e.g., network or a communication link). The received LOD cell data are stored into the system memory.

As will be appreciated, assuming that a designer properly performs step 230, the number of unforeseen accesses to an LOD cell may be minimized. In addition, if the projection of an eye-point is included in a subject LOD cell which is already in the system memory, the set of designated LOD cells for the subject LOD cells may be retrieved in parallel while the system generates display signals using the data in the subject LOD cell. Thus, if the system requires access to one of the LOD cells in the set of designated LOD cells at a later time, a system of the present invention ensures that the LOD cell is immediately available (or with a minimum latency) in the system memory. Thus, the system may have speedy access to the desired data.

In one embodiment of the present invention, the retrieval of elements in the designated list is prioritized according to the LOD level. Specifically, all LOD cells in coarser LODs are retrieved first. This enables the embodiment to base the display on data in coarser LOD cells if the finer LOD cells are not yet retrieved into the system memory. Even though the resulting display may not be as clear as if based on finer LOD cells, the embodiment can provide display signals at a desired rate by basing the display on coarser LOD cells. As is well appreciated in the art, lack of such timely availability of LOD data may lead to undesirable artifacts in the display.

Figure 3:
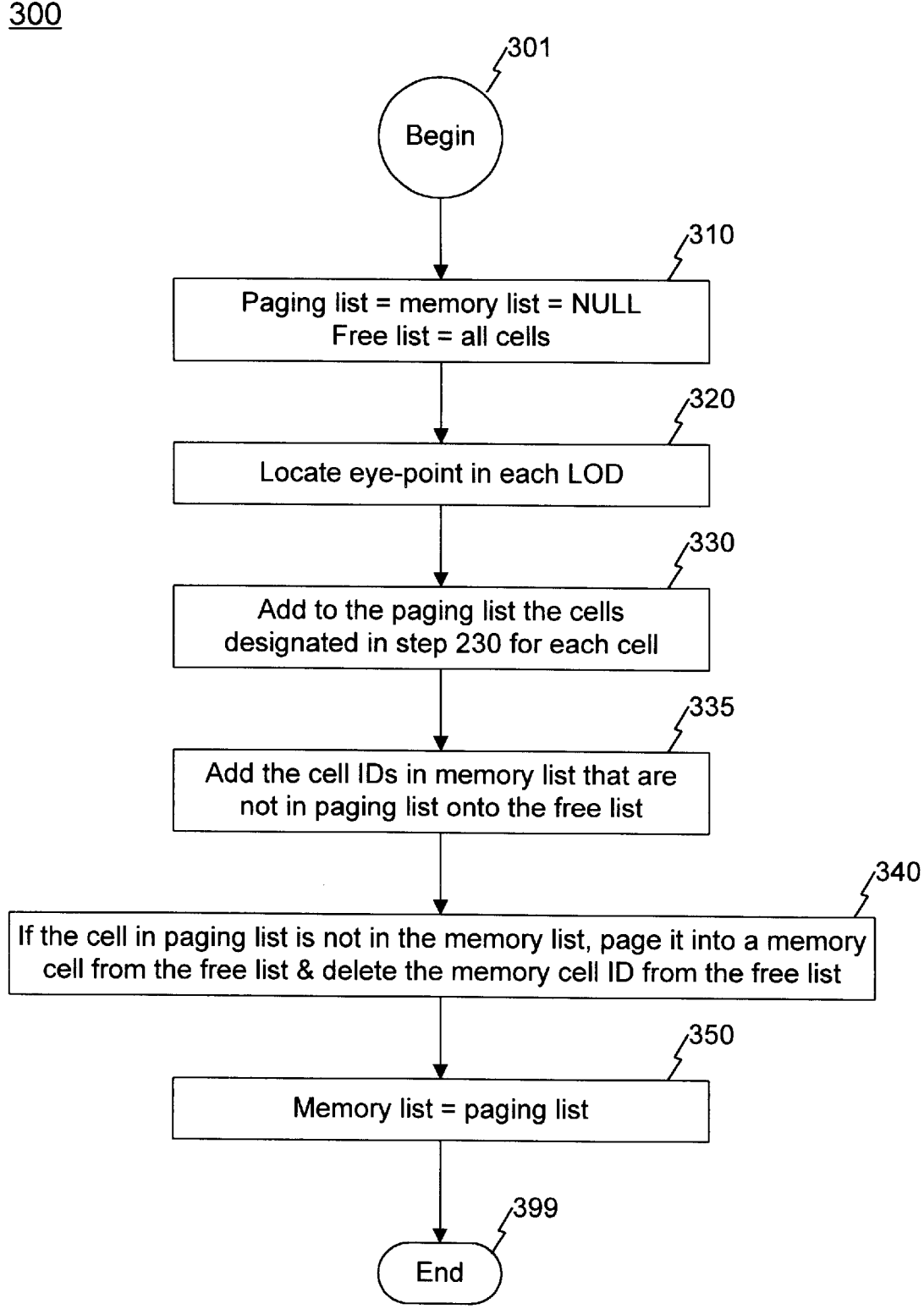
FIG. 3 is a flowchart illustrating a method for replacing the pre-stored LOD cells in a system memory when additional designated LOD cells are received and stored in the system memory according to one embodiment of the present invention.

In step 260, the received LOD cells are stored in the system memory. As the memory size may be limited, some of the LOD cells in the memory may need to be replaced. An example replacement method is explained below with reference to FIG. 3. However, for a clearer understanding of the replacement method, it is helpful to illustrate an example LOD cell structure, an example implementation of the organization of LOD cells in system memory, and an example computer system. Thus, an example computer system for implementing the present invention is illustrated first, followed by the explanation of an example LOD cell structure and the organization of the LOD cells in the memory.

4. Implementation in an Example Computer System

As noted above, the invention may be implemented using hardware, software or a combination thereof and may be implemented in a computer system or other processing system. In fact, in one embodiment, the invention is directed toward a computer system capable of carrying out the functionality described herein. An example computer system 102 is shown in FIG. 1. Computer system 102 includes one or more processors, such as processor 104. Processor 104 is connected to a communication bus 106. Various software embodiments are described in terms of this example computer system. After reading this description, it will become apparent to a person skilled in the relevant art how to implement the invention using other computer systems and/or computer architectures.

Computer system 102 also includes a system memory such as main memory 108 (preferably random access memory), secondary memory 110, graphics controller 140, cache memory 160, and display unit 150. In one embodiment, processor 104 performs the steps of the flowchart of FIG. 2, and sends display data (e.g. data corresponding LOD cells) representative of an object to graphics controller 140 using bus 106. Graphics controller 140 may process the display data and generate display signals on bus 145. In response to the display signals, display unit 150 generates an image representative of the object.

It should be understood that the functions of the individual components of computer system 102 are provided by way of an example for illustration purposes only. In will be appreciated by one skilled in the relevant art that several modifications may be made to computer system 102 without departing from the scope and spirit of the present invention. For example, some of the functions performed by processor 104 may be performed instead in graphics controller 140. In an alternative embodiment, graphics controller 140 and processor 104 may be implemented in a single semiconductor chip. In general, the functions performed by individual components may be varied depending on the specific design requirements and available technologies without departing from the scope and spirit of the present invention.

In an embodiment of the present invention, the data corresponding to LOD cells may be provided to computer system 102 by pre-storing in secondary memory 110. Such LOD cells may be retrieved into main memory 108 before being processed by processor 104 as described above. In an alternative embodiment, computer system 102 may receive LOD cell data from an external system over communication interface 124.

Secondary memory 110 can include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 102. Such means can include, for example, a removable storage unit 122 and an interface 120. Examples of such can include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 118 to computer system 102.

Computer system 102 can also include a communications interface 124. Communications interface 124 allows software and data to be transferred between computer system 102 and external devices. Examples of communications interface 124 can include, without limitation, a modem, a network interface (such as an Ethernet card), a communications port, a PCMCIA card, etc. Software and data transferred via communications interface 124 are in the form of signals which can be electronic, electromagnetic, optical or other signals capable of being received by communications interface 124. These signals 126 are provided to communications interface via a channel 128. This channel 128 carries signals 126 and can be implemented using wire or cable, fiber optics, a phone line, a cellular phone link, an RF link and other communications channels.

In this document, the terms "computer program medium" and "computer usable medium" are used to generally refer to media such as removable storage device 118, a hard disk installed in hard disk drive 112, and signals 126. These computer program products are means for providing software to computer system 102.

Computer programs (also called computer control logic) are stored in main memory and/or secondary memory 110. Computer programs can also be received via communications interface 124. Such computer programs, when executed, enable the computer system 102 to perform the features of the present invention as discussed herein. In particular, the computer programs, when executed, enable the processor 104 to perform the features of the present invention. Accordingly, such computer programs represent controllers of the computer system 102.

In an embodiment where the invention is implement using software, the software may be stored in a computer program product and loaded into computer system 102 using removable storage drive 114, hard drive 112 or communications interface 124. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The operation of computer system 102 is now explained with reference to the flowchart of FIG. 2. The method begins at step 201. In step 210, computer system 102 enables a user to divide each LOD into a plurality of LOD cells. The LOD data may be generated using one of several known methods. Alternatively, the LODs may be divided elsewhere and provided to computer system 102. Computer system 102 may store each LOD cell as a unit which can retrieved independently of the others in step 220. Computer system 102 may perform any processing steps required before performing such storage. The processing steps may be performed, for example, to generate data indicative of various associations between cells and LODs. Each LOD can be stored as a file on hard-drive 112.

In step 230, computer system 102 further enables a user to associate a set of LOD cells with each subject LOD cell. The computer system 102 then designates the set of LOD cells with the corresponding subject cell. In an alternate embodiment, computer system 102 designates the sets of LOD cells dynamically as explained above.

Steps 240, 250, 260, and 270 are typically performed while computer system 102 generates a sequence of display frames on display unit 150. Steps 240–270 are repeated each time the projection of the eye-point moves. The projection may change either because of a relative change in the position of the eye (camera or view), or due to a relative change in the direction of the eye-sight.

In step 240, the projection of eye-point is determined in a known method. In step 250, a cell in each LOD which includes the projection point is determined. In step 260, computer system 102 retrieves (and in the process receives) each set of cells designated with the cells determined in step 250. The data retrieved is stored in main memory 108 and/or cache 160 in step 270. Processor 104 processes the LOD data and sends the processed data to graphics controller 140 over bus 106. Graphics controller 140 generates display signals on display bus 145. The display signals cause the image of an object to be displayed on display unit 150.

Thus, computer system 102 has access to LOD data from faster main memory 108 while generating the display of an object. Due to the relatively high-speed of access from main memory 108, computer system may generate display signals at a required rate. The method ends at step 299.

5. Example LOD Cell

Figure 4:
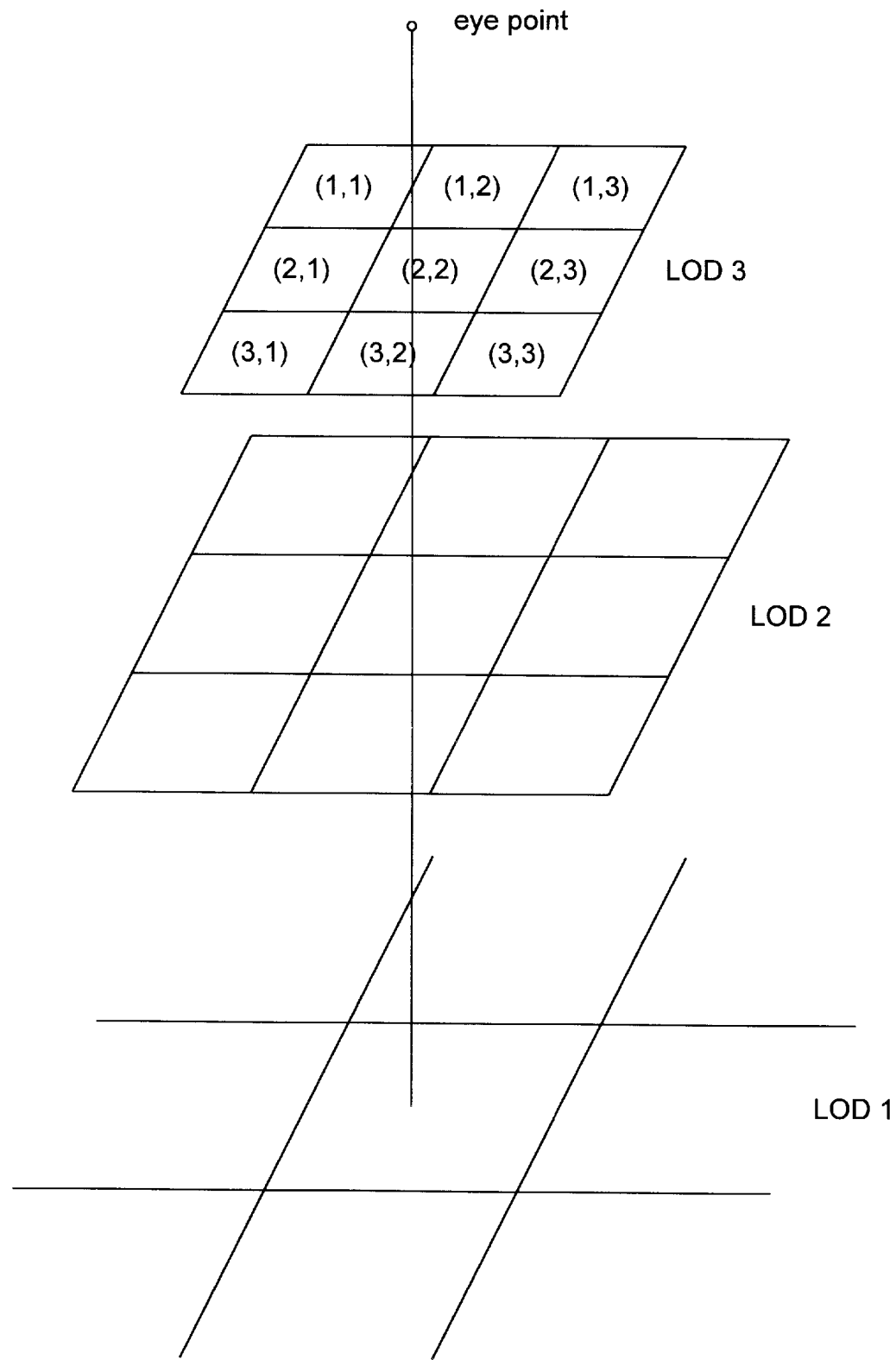
FIG. 4 is a diagram illustrating an LOD cell defined by dividing LOD representation of an object according to one embodiment of the present invention.

FIG. 4 is a diagram of LOD representations (LODs 1, 2, and 3) illustrating the division of each LOD into several LOD cells. Each cell typically contains several polygons (e.g., triangles). Processing of polygons to generate displays is well known in the art. Some of the triangles at the edges of the cells may cross multiple LOD cells. In an alternative embodiment, the LOD cells include triangles completely, in which case the LOD cell boundaries may not be perfect straight lines.

In one embodiment, each LOD is divided into an equal number of LOD cells and each LOD cell includes equal number of points of the object space. However, it will be apparent to one skilled in the relevant art to practice the present invention with different LODs having different numbers of LOD cells and/or with each LOD cell having a different size.

Thus, in the example of FIG. 4, both LODs 2 and 3 are shown divided into nine square LOD cells represented as (1,1), (1,2), (1,3), (2,1), . . . , (3,3). LOD 1 is shown only partially due to space limitations. As already noted, the LOD cells can be of a different shape, including without limitation, triangular, rectangular, or polygonal shape.

As noted with reference to step 230, a list of LOD cells may be designated with each LOD cell. The list of LOD cells corresponding to a subject LOD cell are loaded into the system memory when the projection of the eye point is in the subject LOD cell. In one embodiment, associated with each LOD is also a threshold function which is evaluated to determine whether to include the list of LOD cells for that LOD. For example, the threshold function can include only the distance of the eye-point from the object as a variable. LOD cells in an LOD may be loaded only if the distance is less than a pre-specified number. This embodiment is described as using only the distance as a factor. In alternative embodiments, combination other factors can be used for such determination.

6. Example Organization of the System Memory

As already noted, the system memory stores the LOD cells and provides the LOD data for faster access while generating display signals. As explained with reference to FIG. 1, system memory can be a random access memory. In one embodiment, a predetermined number of memory locations are allocated for all the LOD data. This number is determined by the size of the offset lists (or the number of LOD cells designated with each LOD cell in step 230) and the LOD cell size. For ease of implementation, a maximum LOD cell size (number of memory locations) and the maximum number of LOD cells which are designated with an LOD cell are determined. A memory size equal to the maximum LOD cell size times the maximum number of LOD cells which are designated with an LOD cell are allocated. The allocated memory space may be viewed as including number of memory cells, each equal to the maximum LOD cell size and having a unique memory cell identification number.

Figure 5:
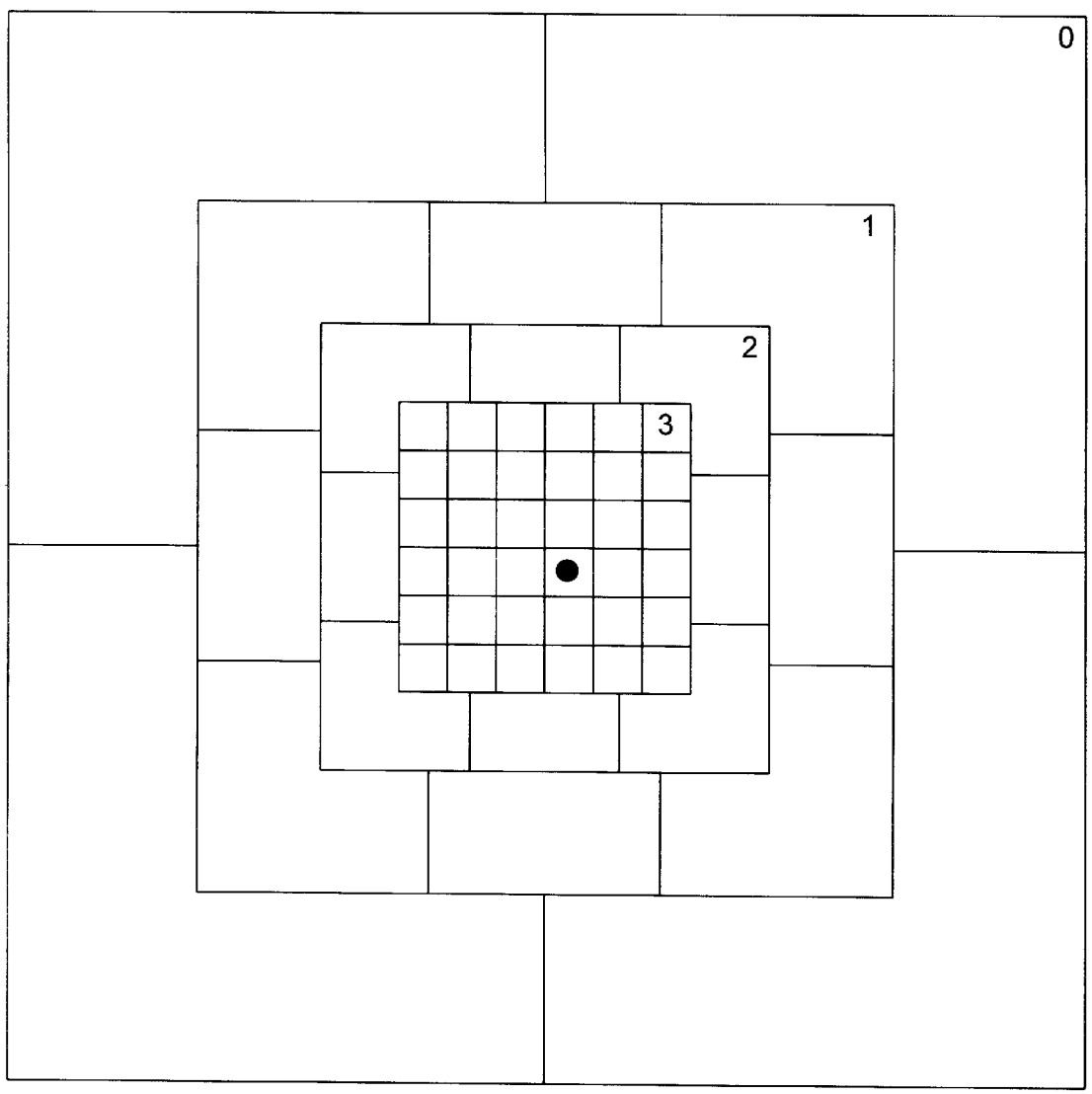
FIG. 5 is a diagram illustrating an example set of LOD cells from different LOD levels present in the system memory.

Also, different LOD cells retrieved into the system memory may represent different portions of the object as illustrated with reference to FIG. 5. In FIG. 5, the portions of an object represented by different LOD cells in the system memory are illustrated. Each of the finer LODs (e.g., LOD 3) generally represents a smaller portion of the object compared to a coarser LOD cell. In FIG. 5, portions representing finer LODs are shown superimposed over portions representing coarser LOD merely to illustrate that the finer LOD cells may represent a smaller portion of the object.

If the LOD cells are of variable (or different) size as explained above, certain inefficiency in the usage of the system memory may be encountered. However, the organization of LOD cells in the memory may be simplified as explained below with reference to the cell replacement scheme in the system memory.

7. Example Cell Replacement Scheme

As already noted, the designated LOD cells corresponding to a subject LOD cell are retrieved and stored in the system memory when the projection of an eye point falls within the subject LOD cell. Such storage may require the replacement of some of the LOD cells pre-existing in the system memory. An example implementation of such scheme is explained with reference to the flowchart of FIG. 3.

It is helpful to first understand the lists referenced to in this scheme. Memory list includes a list of all LOD cells presently in the system memory. Free list is a list of all memory cells which store LOD cells not required to be in the system memory, i.e., the members in the free list are suitable for replacement. Paging list is the list of all LOD cells required to be in the system memory.

With reference to flowchart 300. In step 310, the paging list and memory list are set to NULL (i.e., emptied), and the free list is set to all the memory cells. In step 320, the projection of an eye point (or other point of interest) is located in an LOD cell of each LOD. In step 330, for each LOD cell located in step 320, the list of LOD cells designated in step 230 are added to the paging list. Thus, the paging list indicates the list of LOD cells that are desirable to be present in the system memory for faster access.

In step 335, the memory cells in the memory list that are not in the paging list are added to the free list. The LOD cells in the memory cells of the free list need not be present in the system memory and are therefore suitable for replacement. In step 340, if an LOD cell in the paging list is not in the memory list, it is paged into a memory cell. The replaced LOD cell is deleted from the free list. In step 350, the memory list is set equal to the paging list. The method ends at step 399.

It should be understood that the above flowchart is an example implementation for managing the memory cells. Other replacement schemes can be used depending on the specific system requirements. For example, the replacement scheme may be modified such that the memory list further indicates the LOD cells that are not replaced, but are available for replacement. In addition, a criteria which uses the history of usage of the cells may be used in the replacement decision.

8. Conclusion

Thus, the present invention is described in the context of several examples. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of displaying an object represented in a plurality of levels of detail (LODs), the method comprising the steps of:

storing in a secondary memory each LOD divided into a plurality of LOD cells, wherein each LOD cell represents a portion of the object;

pre-designating, for each LOD cell, a corresponding set of LOD cells to be loaded into system memory with the corresponding LOD cell, whereby the probability is increased that a desired portion of the object is available in system memory when required for processing;

after the pre-designating step, determining a point of interest on the object;

determining, for each LOD, an LOD cell including the point of interest;

retrieving from the secondary memory, for each LOD, the determined LOD cell and a corresponding set of pre-designated LOD cells;

storing in a system memory the retrieved LOD cells and corresponding sets of pre-designated LOD cells; and generating display signals from LOD cells selected from the LOD cells and corresponding sets of pre-designated LOD cells stored in system memory.

2. The method of claim 1, wherein each LOD cell comprises a polygon.

3. The method of claim 1, wherein the step of storing further comprises the step of replacing LOD cells that are no longer required in system memory according to a predetermined LOD cell replacement scheme.

4. The method of claim 3, wherein the predetermined LOD cell replacement scheme comprises the steps of:

dividing the system memory into a plurality of memory cells, wherein all memory cells have an equal number of memory locations;

maintaining a paging list indicative of LOD cells required to be in the system memory according to the retrieving step;

maintaining a free list indicative of memory cells which store LOD cells not required to be in the system memory; and replacing the LOD cells indicated in the free list with LOD cells required to be in system memory.

5. The method of claim 1, wherein the point of interest comprises the projection of an eye-point onto the object.

6. The method of claim 1, wherein the pre-designating step comprises the step of providing an offset list having elements, wherein each element of the offset list identifies one LOD cell of the corresponding set of LOD cells.

7. The method of claim 1, wherein the pre-designating step comprises the step of designating a single LOD cell.

8. The method of claim 1, further comprising the steps of:
associating a threshold function with each LOD;
evaluating the threshold function for each LOD; and
retrieving the plurality of LOD cells in an LOD only if the corresponding threshold function returns a first value.

9. The method of claim 8, wherein the threshold function comprises the distance of an eye-point to the object as a variable.

10. The method of claim 1, further comprising the step of enabling a user to divide each LOD into a plurality of LOD cells.

11. The method of claim 1, further comprising the step of enabling a user to pre-designate the corresponding set of LOD cells with each of the plurality of LOD cells.

12. A method of displaying an object represented in a plurality of levels of detail (LODs), the method comprising the steps of:
dividing each LOD into a plurality of LOD cells, wherein each LOD cell represents a portion of the object;
storing each LOD cell in a secondary memory as a unit which can be retrieved without retrieving any other LOD cell;
pre-designating, for each LOD cell, a corresponding set of LOD cells to be loaded into system memory with the corresponding LOD cell, whereby the probability is increased that a desired portion of the object is available in system memory when required for processing;
determining a plurality of desired LOD cells required for generating an image of the object, wherein the plurality of desired LOD cells are comprised in one or more of the LOD representations;
determining, for each LOD, an LOD cell including the point of interest, wherein each of the corresponding sets of LOD cells are comprised in the plurality of desired LOD cells;
retrieving into a system memory the determined plurality of desired LOD cells; and
generating display signals from the stored plurality of desired LOD cells.

13. A system for displaying an object represented in a plurality of levels of detail (LODs), the system comprising:
means for storing in a secondary memory each LOD divided into a plurality of LOD cells, wherein each LOD cell represents a portion of the object;
means for pre-designating, for each LOD cell, a corresponding set of LOD cells to be loaded into system memory with the corresponding LOD cell, whereby the probability is increased that a desired portion of the object is available in system memory when required for processing;
means for determining, after pre-designating the corresponding set of LOD cells, a point of interest on the object;
means for determining, for each LOD, an LOD cell including the point of interest;
means for retrieving from the secondary memory, for each LOD, the determined LOD cell and a corresponding set of pre-designated LOD cells;
means for storing in a system memory the retrieved LOD cells and corresponding sets of pre-designated LOD cells; and
means for generating display signals from LOD cells selected from the LOD cells and corresponding sets of pre-designated LOD cells stored in system memory.

14. The system of claim 13, wherein the means for storing comprises of means for replacing LOD cells that are no longer required in system memory according to a predetermined LOD cell replacement scheme.

15. The system of claim 14, wherein the means for replacing comprises:
means for dividing the system memory into a plurality of memory cells, wherein all memory cells have an equal number of memory locations;
means for maintaining a paging list indicative of LOD cells required to be in the system memory according to the means for retrieving;
means for maintaining a free list indicative of memory cells which store LOD cells not required to be in the system memory; and
means for replacing the LOD cells indicated in the free list with LOD cells required to be in system memory.

16. The system of claim 13, wherein the point of interest comprises the projection of an eye-point onto the object.

17. The system of claim 13, wherein the means for pre-designating comprises means for providing an offset list having elements, wherein each element of the offset list identifies one LOD cell of the corresponding set of LOD cells.

18. The system of claim 13, wherein the means for pre-designating designates a single LOD cell.

19. The system of claim 13, further comprising:
means for associating a threshold function with each LOD;
means for evaluating the threshold function for each LOD; and
means for retrieving the plurality of LOD cells in an LOD only if the corresponding threshold function returns a first value.

20. The system of claim 19, wherein the threshold function comprises the distance of an eye-point to the object as a variable.

21. A computer program product for use with a computer system comprising a host processor, a system memory, a secondary memory, a graphics controller, and a display unit, the computer system for displaying an object represented in a plurality of levels of detail (LODs), the computer program product comprising:
computer readable program code means for causing the computer system to store in secondary memory each LOD divided into a plurality of LOD cells, wherein each LOD cell represents a portion of the object;
computer readable program code means for causing the computer system to pre-designate, for each LOD cell, a corresponding set of LOD cells to be loaded into system memory with the corresponding LOD cell, whereby the probability is increased that a desired portion of the object is available in system memory when required for processing;
computer readable program code means for causing the computer system to determine a point of interest on the object after pre-designating, for each LOD cell, a corresponding set of LOD cells;
computer readable program code means for causing the computer system to determine for each LOD, an LOD cell including the point of interest,
computer readable program code means for causing the computer system to retrieve from the secondary memory, for each LOD, the determined LOD cell and a corresponding set of pre-designated LOD cells;

computer readable program code means for causing the computer system to store in system memory the retrieved LOD cells and corresponding sets of pre-designated LOD cells; and computer readable program code means for causing the computer system to generate display signals from LOD cells selected from the stored LOD cells and corresponding sets of predetermined LOD cells stored in system memory.

22. The computer program product of claim 21, wherein the computer readable program code means for causing the computer system to store comprises computer readable program code means for causing the computer system to replace LOD cells that are no longer required in system memory according to a predetermined LOD cell replacement scheme.

23. The computer program product of claim 22, wherein the computer readable program code means for causing the computer system to replace comprises:

computer readable program code means for causing the computer system to divide the system memory into a plurality of memory cells wherein all memory cells have an equal number of memory locations;

computer readable program code means for causing the computer system to maintain a paging list indicative of LOD cells required to be in system memory after retrieval from the secondary memory, for each LOD, the determined LOD cell and a corresponding set of pre-designated LOD cells;

computer readable program code means for causing the computer system to maintain a free list indicative of memory cells which store LOD cells not required to be in the system memory; and computer readable program code means for causing the computer system to replace the LOD cells indicated in the free list with LOD cells required to be in system memory.

24. The computer program product of claim 21, wherein the point of interest comprises the projection of an eye-point onto the object.

25. The computer program product of claim 21, wherein the computer readable program code means for causing the computer system to pre-designate a set of LOD cells comprises computer readable program code means for causing the computer system to provide an offset list having elements, wherein each element of the offset list identifies one LOD cell of the corresponding set of LOD cells.

26. The computer program product of claim 21, wherein the computer readable program code means for causing the computer system to pre-designate a set of LOD cells causes the computer system to designate a single LOD cell.

27. The computer program product of claim 21, further comprising:

computer readable program code means for causing the computer system to associate a threshold function with each LOD;

computer readable program code means for causing the computer system to evaluate the threshold function for each LOD; and computer readable program code means for causing the computer system to retrieve the plurality of LOD cells in an LOD only if the corresponding threshold function returns a first value.

28. The computer program product of claim 27, wherein the threshold function comprises the distance of an eye-point to the object as a variable.

29. A method of displaying an object represented in a plurality of levels of detail (LODs), the method comprising the steps of:

storing in a secondary memory each LOD divided into a plurality of LOD cells, wherein each LOD cell represents a portion of the object;

pre-designating, for each LOD cell, a corresponding set of LOD cells to be loaded into system memory with the corresponding LOD cell, whereby the probability is increased that a desired portion of the object is available in system memory when required for processing;

after the pre-designating step, determining a point of interest on the object;

determining, for an LOD, an LOD cell including the point of interest;

retrieving from the secondary memory, for each LOD, the determined LOD cell and a corresponding set of pre-designated LOD cells;

storing in a system memory the retrieved LOD cells and corresponding sets of pre-designated LOD cells; and generating display signals from LOD cells selected from the LOD cells and corresponding sets of pre-designated LOD cells stored in system memory.

\* \* \* \* \*

UNITED STATES PATENT AND TRADEMARK OFFICE
CERTIFICATE OF CORRECTION

PATENT NO. : 6,002,406
DATED : December 14, 1999
INVENTOR(S) : Ze Hong Zhao

It is certified that error appears in the above-identified patent and that said Letters Patent is hereby corrected as shown below:

Title page,
Item [54], please replace "Level-Of-Detail" with -- Levels-Of-Detail --.

Column 1,
Lines 3-4, please replace "Level-Of-Detail" with -- Levels-Of-Detail --.

Column 9,
Line 47, please replace "flowchart 300" with -- flowchart 300, the method begins at step 301. --.

Signed and Sealed this

First Day of January, 2002

Attest:

JAMES E. ROGAN
*Attesting Officer*     *Director of the United States Patent and Trademark Office*